United States Patent
Nakajima

(10) Patent No.: US 9,210,315 B2
(45) Date of Patent: Dec. 8, 2015

(54) IMAGE PROCESSING APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventor: Hirofumi Nakajima, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 13/759,450

(22) Filed: Feb. 5, 2013

(65) Prior Publication Data

US 2013/0216199 A1    Aug. 22, 2013

(30) Foreign Application Priority Data

Feb. 20, 2012 (JP) ................. 2012-034537
Dec. 28, 2012 (JP) ................. 2012-288561

(51) Int. Cl.
*H04N 5/232* (2006.01)
*H04N 5/228* (2006.01)
*H04N 9/04* (2006.01)

(52) U.S. Cl.
CPC .......... *H04N 5/23212* (2013.01); *H04N 9/045* (2013.01)

(58) Field of Classification Search
CPC .... H04N 9/045; H04N 5/772; H04N 5/23212
USPC ............... 386/242, 224; 348/222.1, 231.99
See application file for complete search history.

(56) References Cited

U.S. PATENT DOCUMENTS

2011/0228131 A1*  9/2011  Iwane ............... 348/231.99

FOREIGN PATENT DOCUMENTS

| JP | 2002-290831 A | 10/2002 |
| JP | 2008-294741 A | 12/2008 |
| JP | 2011-022796   | 2/2011  |

OTHER PUBLICATIONS

Ren Ng, et al. Light Field Photography with a Hand-held Plenoptic Camera, Stanford University Computer Science tech Report CTSR Feb. 2005 (Cited in the spec. [0003]).

The above foreign patent documents were cited in the May 18, 2015 Japanese Office Action, a copy of which is enclosed without an English Translation, that issued in Japanese Patent Application No. 2012-288561.

* cited by examiner

*Primary Examiner* — Thai Tran
*Assistant Examiner* — Mishawn Hunter
(74) *Attorney, Agent, or Firm* — Cowan, Liebowitz & Latman, P.C.

(57) ABSTRACT

An image processing apparatus obtains an image signal, which is captured by an image capturing apparatus, and in which respective pixels correspond to light fluxes of different combinations of pupil regions, where the light fluxes have passed through in an imaging optical system of the image capturing apparatus, and incident directions. The image processing apparatus sets a focal length corresponding to an object to be focused, and generates a reconstructed image focused on the object of the set focal length from the image signal. The image processing apparatus generates a moving image by concatenating a plurality of reconstructed images generated in association with a plurality of different focal lengths, and outputs the moving image in association with the image signals.

29 Claims, 11 Drawing Sheets

US 9,210,315 B2

IMAGE PROCESSING APPARATUS, IMAGE CAPTURING APPARATUS, CONTROL METHOD, AND RECORDING MEDIUM

BACKGROUND OF THE INVENTION

Field of the Invention

The present invention relates to an image processing apparatus, image capturing apparatus, control method, and recording medium, and particularly to a technique for generating an image focused at an arbitrary focal plane from an image signal after imaging.

In recent years, a technique for recording a distribution of strength and traveling direction of light at the time of imaging as output data, and generating an image focused at an arbitrary focal plane from the output data after recording in an image capturing apparatus such as a digital camera has been proposed.

Ren Ng, et al., "Light Field Photography with a Hand-Held Plenoptic Camera", Stanford University Computer Science Tech Report CTSR 2005-02 discloses a method (Light Field Photography) of separately recording light fluxes entering from various directions by focusing light fluxes which have passed through different pupil regions of an imaging lens on respective pixels (photoelectric converters) of an imaging element via a microlens array. In Light Field data (LF data) obtained in this way, neighboring pixels record light fluxes entering from different directions, and light fluxes in the same direction are extracted from pixels associated with respective microlenses, thereby generating an image captured from that direction. An arbitrary focal length is set, and outputs from pixels which record light fluxes that have passed through one point (corresponding to a pixel) on a focal plane, in which the optical distance from the shooting lens is corresponding to of that focal length, are added, thereby generating (reconstructing) pixels of an image focused at the specific focal length after imaging in a pseudo manner. Hereinafter, if the user of the image sensing apparatus intends to focus on another subject after obtaining the light field data, "deciding a focal length of an imaging optical system in order to focus the other subject, and generating, from the light field data, an image for a refocus plane defined by an optical distance (a distance between a point, at which light beams from the other subject are focused on, and an imaging lens) corresponding to the focal length" is just referred as "generating an image focused on at the focal length (corresponding to the other subject)."

The LF data recorded using the Ren Ng's method cannot be browsed in a state that allows the user to recognize the contents of an object before a focal length is set, and a reconstructed image focused at the focal length is generated, as described above. For example, by generating a thumbnail image to be focused at one focal length for each LF data, the user may choose LF data which captured a desired scene.

However, in such thumbnail image focused at one focal length, which is generated from the LF data, since images of objects focused at focal lengths different from that focal length are blurred, the user cannot recognize the objects. That is, the user cannot specify the LF data which captured a scene including a desired object.

SUMMARY OF THE INVENTION

The present invention has been made in consideration of such conventional problems. The present invention provides an image processing apparatus, image capturing apparatus, control method, and recording medium, which display information that allows the user to specify objects included in a scene, an image signal of which is recorded.

The present invention in its first aspect provides an image processing apparatus comprising: an obtaining unit configured to obtain an image signal, which is captured by an image capturing apparatus, and in which respective pixels correspond to light fluxes of different combinations of pupil regions, where the light fluxes have passed through in an imaging optical system of the image capturing apparatus, and incident directions; a setting unit configured to set a focal length corresponding to an object to be focused in association with a reconstructed image generated from the image signal obtained by the obtaining unit; a generation unit configured to generate the reconstructed image focused at the focal length set by the setting unit by adding pixel values of the image signal corresponding to respective pixels of the reconstructed image; and an output unit configured to generate and output a moving image by concatenating, as frames, a plurality of reconstructed images generated by the generation unit in association with a plurality of different focal lengths.

Further features of the present invention will become apparent from the following description of exemplary embodiments (with reference to the attached drawings).

DESCRIPTION OF THE EMBODIMENTS

Embodiments

An exemplary embodiment of the present invention will be described in detail hereinafter with reference to the drawings. Note that an embodiment to be described hereinafter will explain an example in which the present invention is applied to a digital camera as an example of an image processing apparatus, which records LF data that allows to generate a reconstructed image, a focal length of which is changed after imaging. However, the present invention is applicable to an arbitrary apparatus which can generate LF data that allows to generate a reconstructed image focused at an arbitrary focal length after imaging, or can generate a reconstructed image focused at an arbitrary focal length from the LF data.

In the present specification, "LF data" indicates image data obtained by imaging using a microlens array to each microlens of which a plurality of photoelectric converters of an imaging element are assigned, as will be described later. Each of the plurality of photoelectric converters assigned to one microlens receives a light flux which has passed through a different region of an exit pupil of an imaging optical system. That is, in the LF data, images of neighboring ones of pixels corresponding to outputs of photoelectric converters assigned to one microlens are not continuous. For this reason, by applying processing for generating an image focused at a predetermined focal length after imaging to the LF data of this embodiment, images of neighboring pixels are converted into continuous images. In the present specification, to decide a focal length after imaging and to generate an image focused at that focal length from LF data is expressed as "refocus" or "reconstruction".

<Arrangement of Digital Camera 100>

Figure 1:
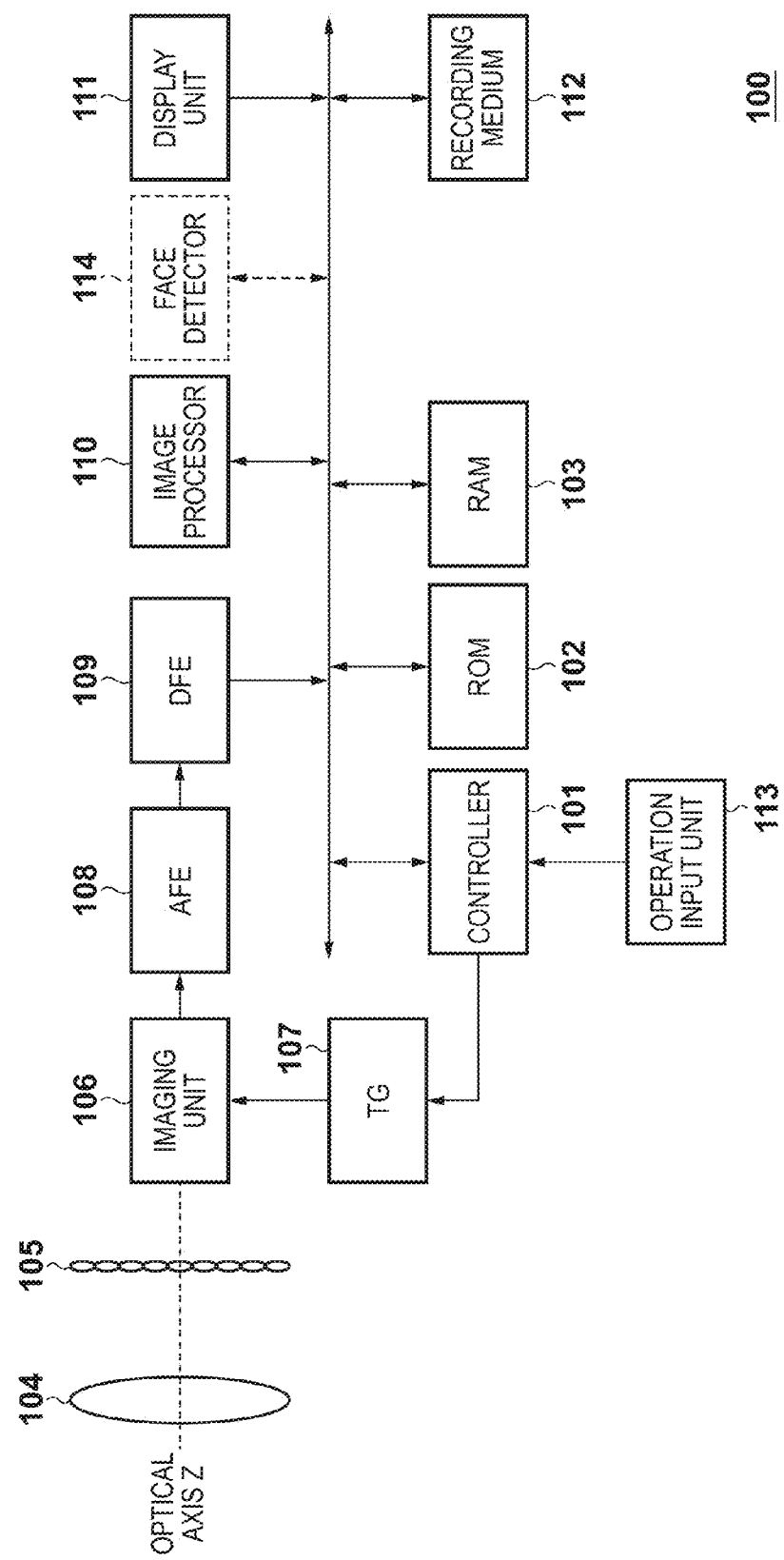
FIG. 1 is a block diagram showing the functional arrangement of a digital camera 100 according to an embodiment of the present invention.

FIG. 1 is a block diagram showing the functional arrangement of a digital camera 100 according to an embodiment of the present invention.

A controller 101 is, for example, a CPU, which controls operations of respective blocks included in the digital camera 100. More specifically, the controller 101 controls the operations of the respective blocks by reading out operation programs of imaging processing and list display processing (to be described later), which programs are stored in a ROM 102, extracting the readout programs onto a RAM 103, and executing the extracted programs.

The ROM 102 is, for example, a rewritable nonvolatile memory, and stores parameters required for the operations of the respective blocks and the like in addition to operation programs of the respective blocks included in the digital camera 100.

The RAM 103 is a volatile memory. The RAM 103 is used not only as an extraction area of the operation programs of the respective blocks included in the digital camera 100 but also as a storage area used to store intermediate data output during the operations of the respective blocks and the like.

An imaging unit 106 is, for example, an imaging element such as a CCD or CMOS sensor. The imaging unit 106 photoelectrically converts an optical image formed on a photoelectric converter surface of the imaging element by an imaging optical system 104 and outputs an analog image signal upon reception of a timing signal output from a TG 107 according to an instruction of the controller 101. Note that the imaging optical system 104 includes, for example, an objective lens, focus lens, stop, and the like. Also, the digital camera 100 of this embodiment includes a microlens array 105 between the imaging optical system 104 and imaging element on an optical axis in addition to microlenses provided to the respective photoelectric converters of the imaging element.

(Relationship Between Microlens and Photoelectric Converter)

The microlens array 105 arranged between the imaging optical system 104 and imaging element on the optical axis in the digital camera 100 of this embodiment will be described below using the drawings.

Figure 2:
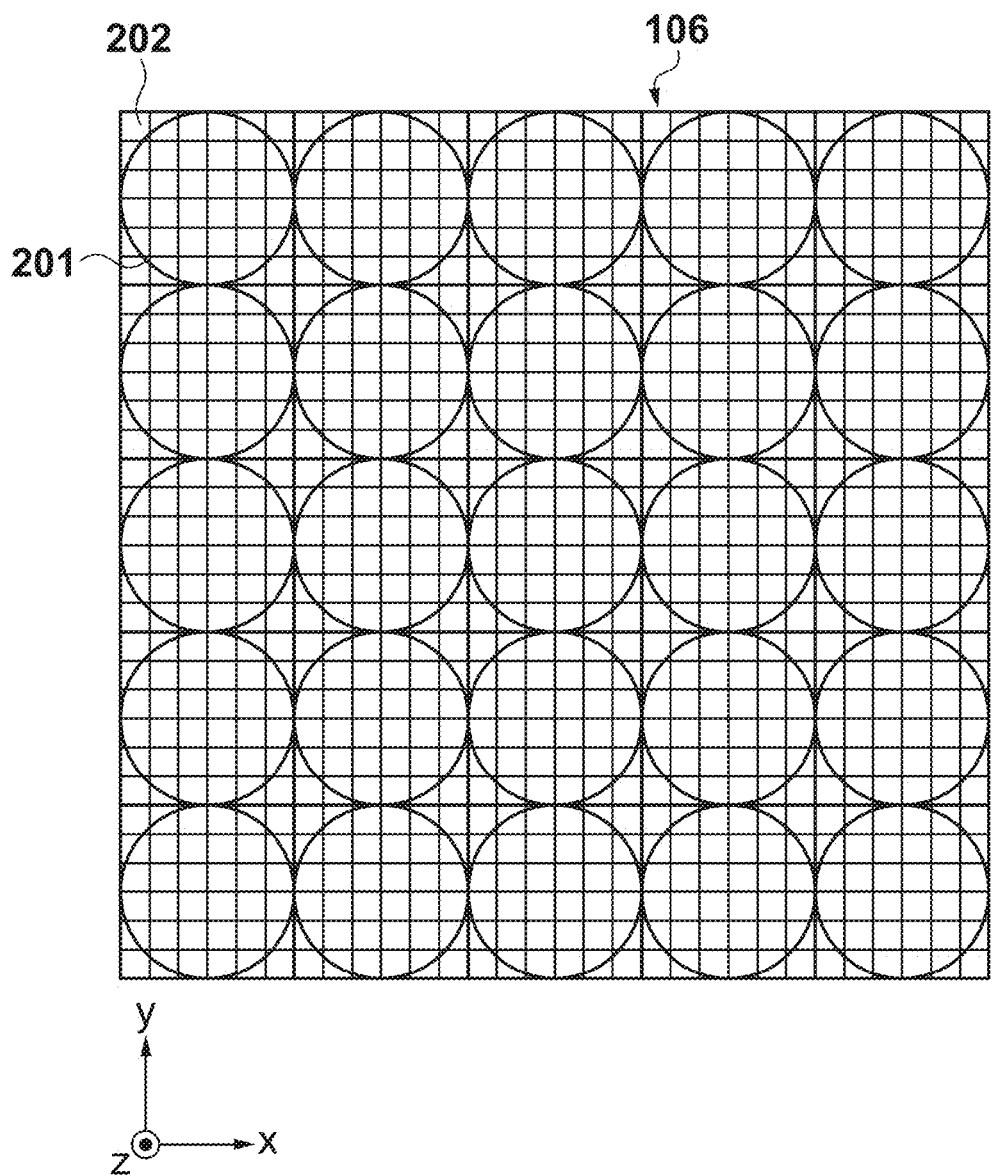
FIG. 2 is a view for explaining the relationship between a microlens array 105 and photoelectric converters of an imaging element according to the embodiment of the present invention.

As shown in FIG. 2, the microlens array 105 of this embodiment includes a plurality of microlenses 201. In FIG. 2, an optical axis of the imaging optical system 104 is defined as a z-axis, a horizontal direction at a lateral position of the digital camera 100 is defined as an x-axis, and a vertical direction is defined as a y-axis. Note that in the example of FIG. 2, the following description will be given under the assumption that the microlens array 105 includes the microlenses 201 arrayed in 5 rows×5 columns, for the sake of simplicity. However, the arrangement of the microlens array 105 is not limited to this.

FIG. 2 illustrates photoelectric converters 202 of the imaging element included in the imaging unit 106 by grids. A predetermined number of photoelectric converters 202 are associated with each microlens 201. In the example of FIG. 2, the photoelectric converters 202 of 36 (=6×6) pixels are associated with one microlens 201. Light fluxes which have passed through one microlens 201 are separated according to incident directions, and form images on the corresponding photoelectric converters 202.

Figure 3:
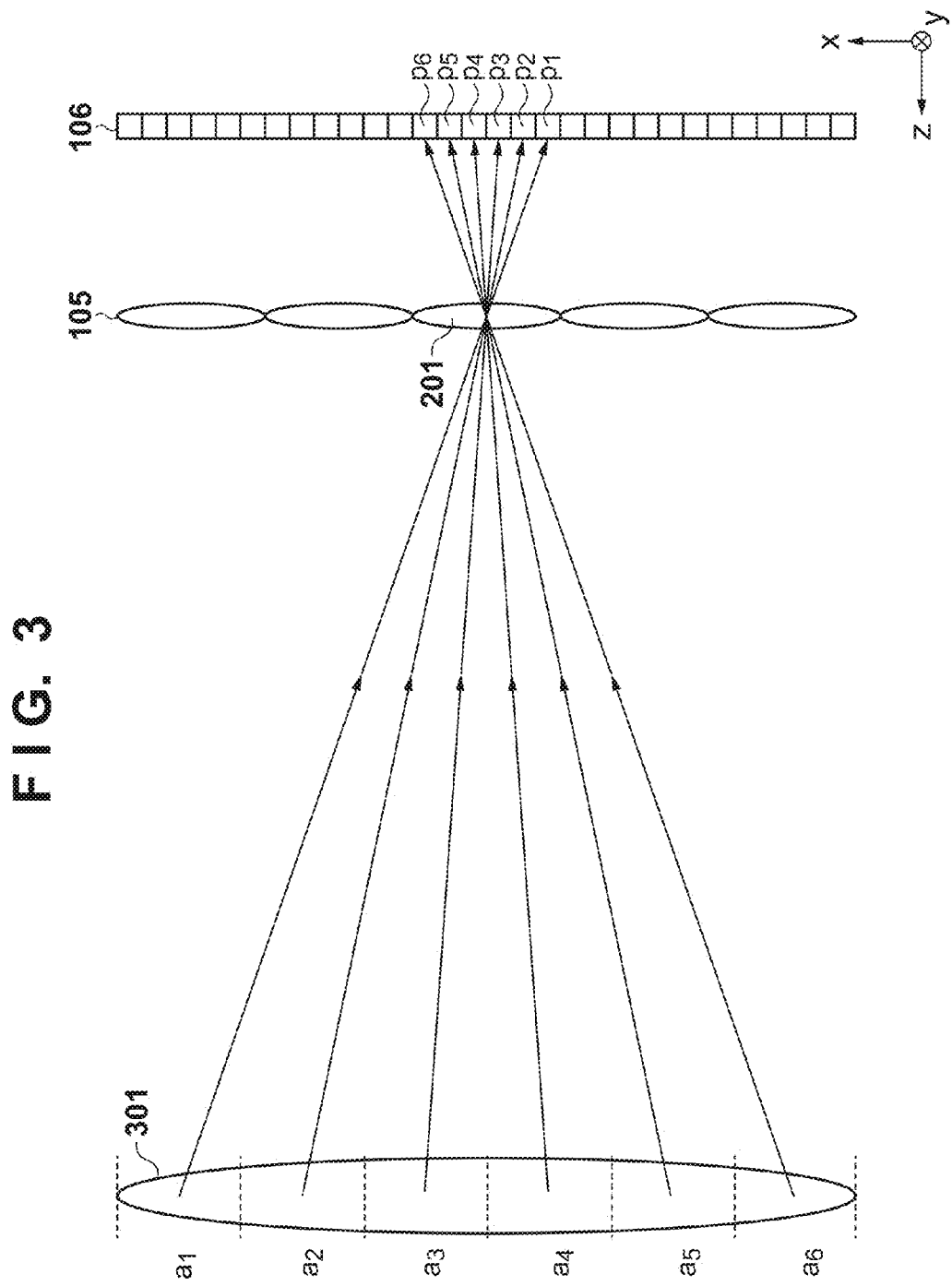
FIG. 3 is another view for explaining the relationship between the microlens array 105 and photoelectric converters of an imaging element according to the embodiment of the present invention.

FIG. 3 shows light fluxes which enter photoelectric converters 202 $p_1$ to $p_6$ corresponding to one microlens 201. FIG. 3 exemplifies optical paths of light fluxes which enter the respective photoelectric converters 202 when viewed from the vertical direction at the lateral position of the digital camera 100. As shown in FIG. 3, light fluxes which have passed through regions $a_1$ to $a_5$ obtained by dividing an exit pupil 301 of the imaging optical system 104 into six via one microlens 201 respectively enter the horizontally arrayed photoelectric converters 202 $p_1$ to $p_6$. Note that numerals given to the respective regions indicate a correspondence relationship with the photoelectric converters 202 which light fluxes which have passed through these regions enter.

Figure 4B:
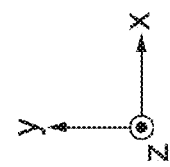
FIGS. 4A and 4B are views for explaining the relationship between a pupil region of an imaging lens and photoelectric converters corresponding to one microlens according to the embodiment of the present invention.
Figure 4A:
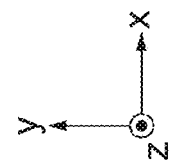

Note that the example of FIG. 3 shows the optical paths of the light fluxes which enter the photoelectric converters 202 when viewed from the vertical direction. However, light fluxes are separated not only in the horizontal direction but also similarly along the y-axis as the optical axis of the imaging optical system 104. That is, when the exit pupil of the imaging optical system 104 is divided into regions shown in FIG. 4A when viewed from the imaging element side, light fluxes which have passed through the respective regions enter those given with identical identification numbers of the photoelectric converters 202 shown in FIG. 4B. Assume that the imaging optical system 104 and the respective microlenses of the microlens array 105 have nearly matched F-numbers (F values).

An AFE 108 and DFE 109 apply correction processing and the like to an image signal generated by the imaging unit 106. More specifically, the AFE 108 applies reference level adjustment (clamp processing) and A/D conversion processing to an analog image signal output from the imaging unit 106, and outputs a digital image signal (LF data) to the DFE 109. The DFE 109 corrects a slight reference level shift and the like of the input LF data.

An image processor 110 applies various kinds of image processing such as color conversion, white balance adjustment, and γ correction processing to the LF data which has undergone the correction processing of the DFE 109. Various kinds of image processing may be different in accordance with, for example, an imaging mode set in the digital camera 100. Also, in this embodiment, the image processor 110 also executes processing for generating a reconstructed image (refocus image) focused at an arbitrary focal length from the LF data. Here, the term "the focal length at which the subject is focused on" indicates "the optical distance between a point, at which light beams from the subject are focused on, and an imaging lens" as described above, and hereinafter the term is used for defining "a focal plane at which an optical image of the subject is focused on." An image focused at an arbitrary focal length may be generated using, for example, the aforementioned "Light Field Photography" method disclosed by Ren Ng.

A display unit 111 is, for example, a display device such as a compact LCD included in the digital camera 100. The display unit 111 displays an image which is generated by the image processor 110 and is focused at an arbitrary focal length. As described above, in the LF data obtained by A/D-converting the analog image signal output from the imaging unit 106 of this embodiment, images are not concatenated in neighboring pixels. For this reason, the display unit 111 displays not the LF data but a reconstructed image generated by the image processor 110.

A recording medium 112 is, for example, an internal memory included in the digital camera 100 or a recording device such as a memory card or HDD detachably connected to the digital camera 100. The recording medium 112 records LF data and a moving image used to confirm an object, which image is associated with respective LF data and is generated from the LF data.

An operation input unit 113 is, for example, a user interface such as a power button and shutter button included in the digital camera 100. Upon detection of an operation at the user interface by the user, the operation input unit 113 outputs a control signal corresponding to that operation to the controller 101.

<Imaging Processing>

Figure 5:
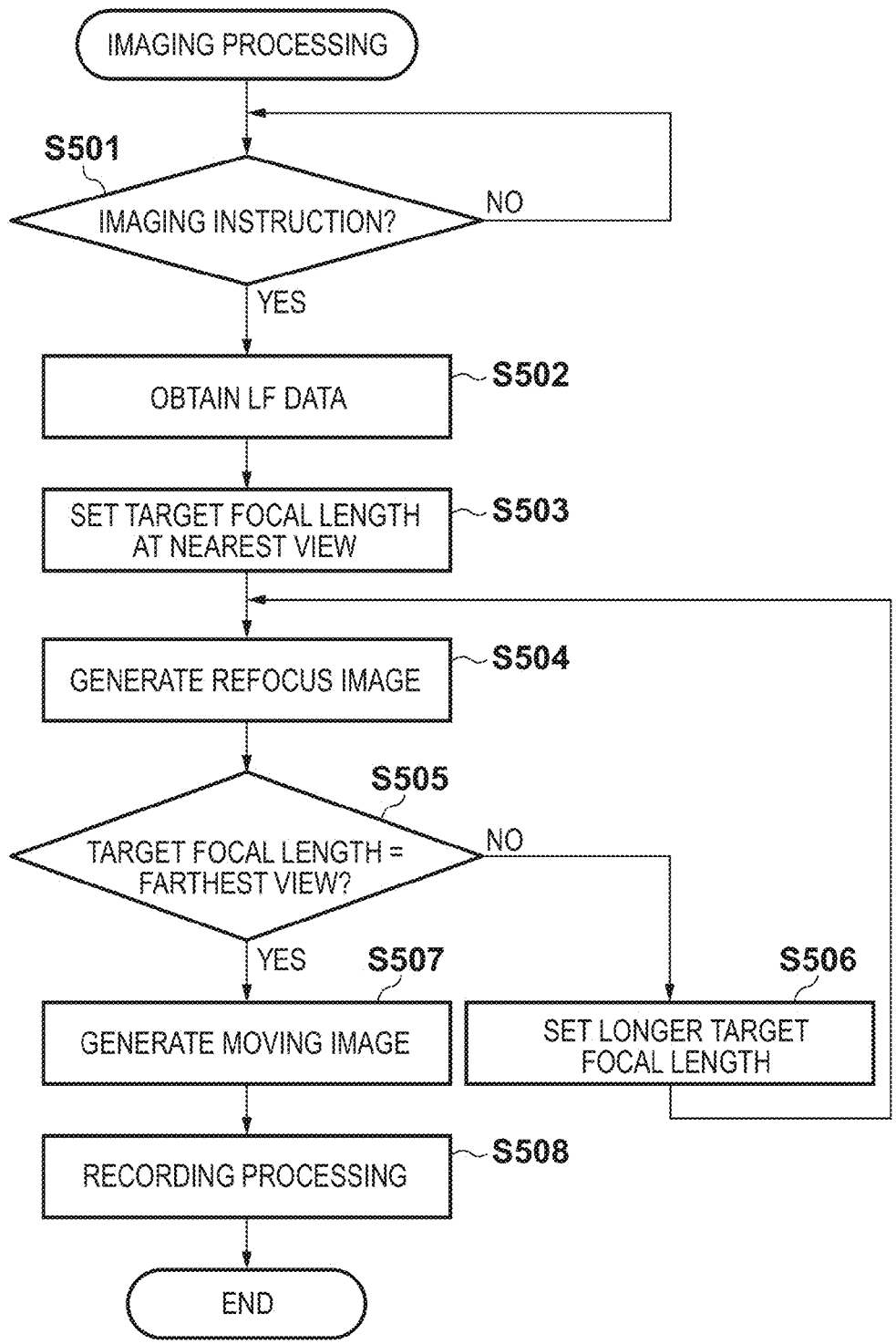
FIG. 5 is a flowchart showing an example of imaging processing according to the embodiment of the resent invention.

The imaging processing of the digital camera 100 of this embodiment with the aforementioned arrangement will be described in detail below with reference to the flowchart shown in FIG. 5. The processing corresponding to this flowchart can be implemented when the controller 101 reads out a corresponding processing program stored in, for example, the ROM 102, extracts the readout program onto the RAM 103, and executes the extracted program. Note that the following description will be given under the assumption that this imaging processing is started, for example, when the digital camera 100 is activated.

The controller 101 judges in step S501 whether or not an imaging instruction is input. More specifically, the controller 101 judges whether or not the imaging instruction is input by judging whether or not a control signal indicating the operation of the shutter button (not shown) by the user is received from the operation input unit 113. If the controller 101 judges that the imaging instruction is input, it shifts the process to step S502; otherwise, the controller 101 repeats the process of this step.

In step S502, the controller 101 executes imaging processing, and obtains LF data associated with an image signal output from the imaging unit 106. More specifically, the controller 101 obtains LF data which is A/D-converted by the AFE 108 and is applied with the correction processing by the DFE 109, and stores the LF data in the RAM 103.

In step S503, the controller 101 sets a target focal length used to generate a refocus image to be a shortest focal length, that is, a focal length focused on an object of a nearest view.

In step S504, the controller 101 controls the image processor 110 to generate a refocus image focused at the set target focal length. That is, the image processor 110 generates (reconstructs), in a pseudo manner, an image formed on a refocus plane decided according to the set target focal length between the imaging lens of the imaging optical system 104 and the microlens array 105.

The correspondence relationship between the pupil regions of the imaging lens where light fluxes, which have passed through respective pixels of an image formed on the refocus plane, emerge, and the microlenses which the light fluxes enter will be described below with reference to the drawings.

In the digital camera 100 of this embodiment, a plurality of pixels assigned to one microlens respectively receive light fluxes which have passed through different regions of the exit pupil of the imaging lens, as described above. The same applies to all the microlenses of the microlens array 105. Also, since light fluxes which have passed through the imaging lens enter the respective microlenses from different directions, all the pixels of the imaging element receive light fluxes having different combinations of the passed pupil regions and incident directions.

Figure 6:
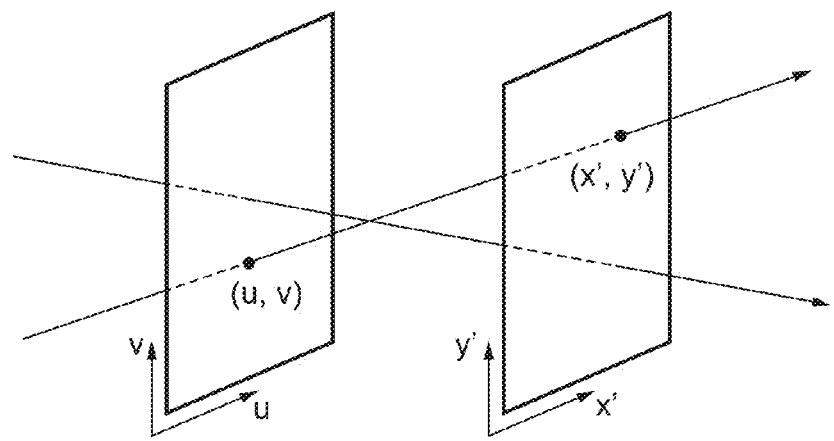
FIG. 6 is a view for explaining optical paths of light fluxes which enter respective photoelectric converters of the imaging element according to the embodiment of the present invention.

For this reason, in the digital camera 100 of this embodiment, an optical path of a light flux which enters each pixel of LF data obtained by imaging is defined by coordinates (u, v) of the passed pupil region in the exit pupil and position coordinates (x', y') of the corresponding microlens, as shown in FIG. 6. Upon generation of a refocus image, a pixel value can be obtained by integrating light fluxes having optical paths which pass through the pixel in association with a pixel (x, y) on the refocus plane.

Figure 7:
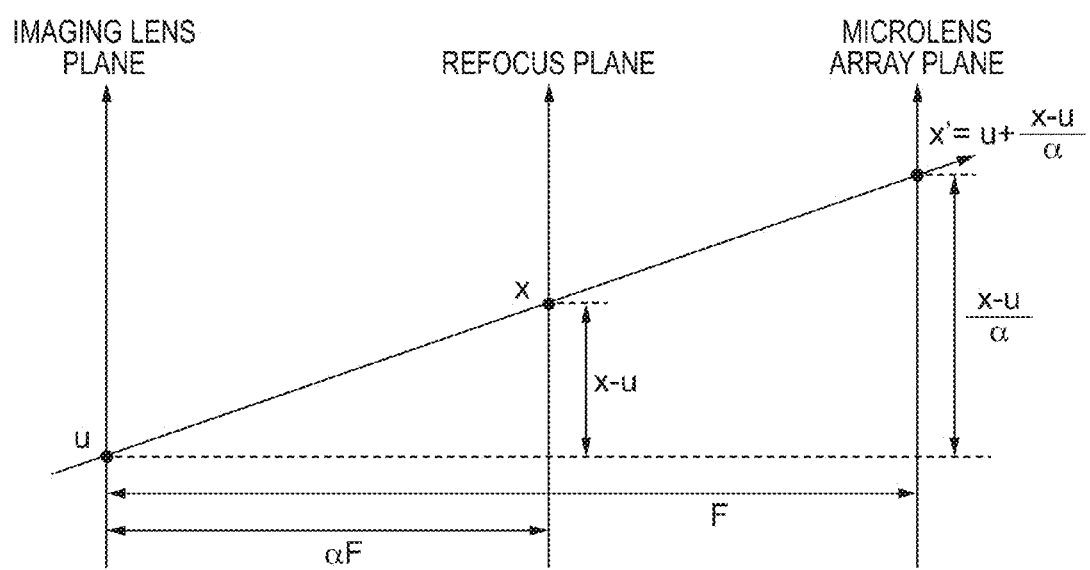
FIG. 7 is a view for explaining a refocus image generation method according to the embodiment of the present invention.

FIG. 7 shows an optical path of a light flux on a horizontal plane (x-z plane) when viewed from the vertical direction at the lateral position of the digital camera 100. The following description will be given in association with an optical path of a light flux which passes through each pixel on the refocus surface on the x-z plane. Also, the same applies to a y-z plane.

Letting (u, v) be coordinates of a pupil region and (x, y) be pixel coordinates on the refocus plane, position coordinates (x', y') of a microlens on the microlens array 105 on which a light flux which has passed through this pupil divided region and the pixel on the refocus plane are expressed by:

$$(x', y') = \left(u + \frac{x-u}{\alpha}, v + \frac{y-v}{\alpha}\right)$$

where F is a distance from the imaging lens to the microlens array, and αF is a distance from the imaging lens to the refocus plane (α is a refocus coefficient: a variable coefficient required to decide a distance to the refocus plane).

Also, letting L(x', y', u, v) be an output of a photoelectric converter which receives the light flux, a pixel output E(x, y) at the coordinates (x, y) of an image formed on the refocus plane is obtained by integrating the output L(x', y', u, v) in association with the pupil region of the imaging lens, and is expressed by:

$$E(x, y) = \frac{1}{\alpha^2 F^2} \int \int L\left(u + \frac{x-u}{\alpha}, v + \frac{y-v}{\alpha}, u, v\right) du\, dv$$

Note that when coordinates (u, v) are set as representative coordinates of the pupil region, this equation can be calculated by simple additions.

By calculating the integral equation for all the pixels in this manner, the image processor 110 can generate a still image focused at the target focal length. The controller 101 stores the generated still image in the RAM 103.

The controller 101 judges in step S505 whether or not the set target focal length is a longest focal length of a refocus range, that is, a focal length focused on an object of a farthest view. If the controller 101 judges that the target focal length is the longest focal length of the refocus range, it shifts the process to step S507; otherwise, it shifts the process to step S506.

In step S506, the controller 101 sets the target focal length used to generate a refocus image to be a focal length longer than the currently set focal length, and returns the process to step S504. Note that the newly set target focal length may be a focal length obtained by adding a predetermined length to the currently set focal length.

Figure 8:
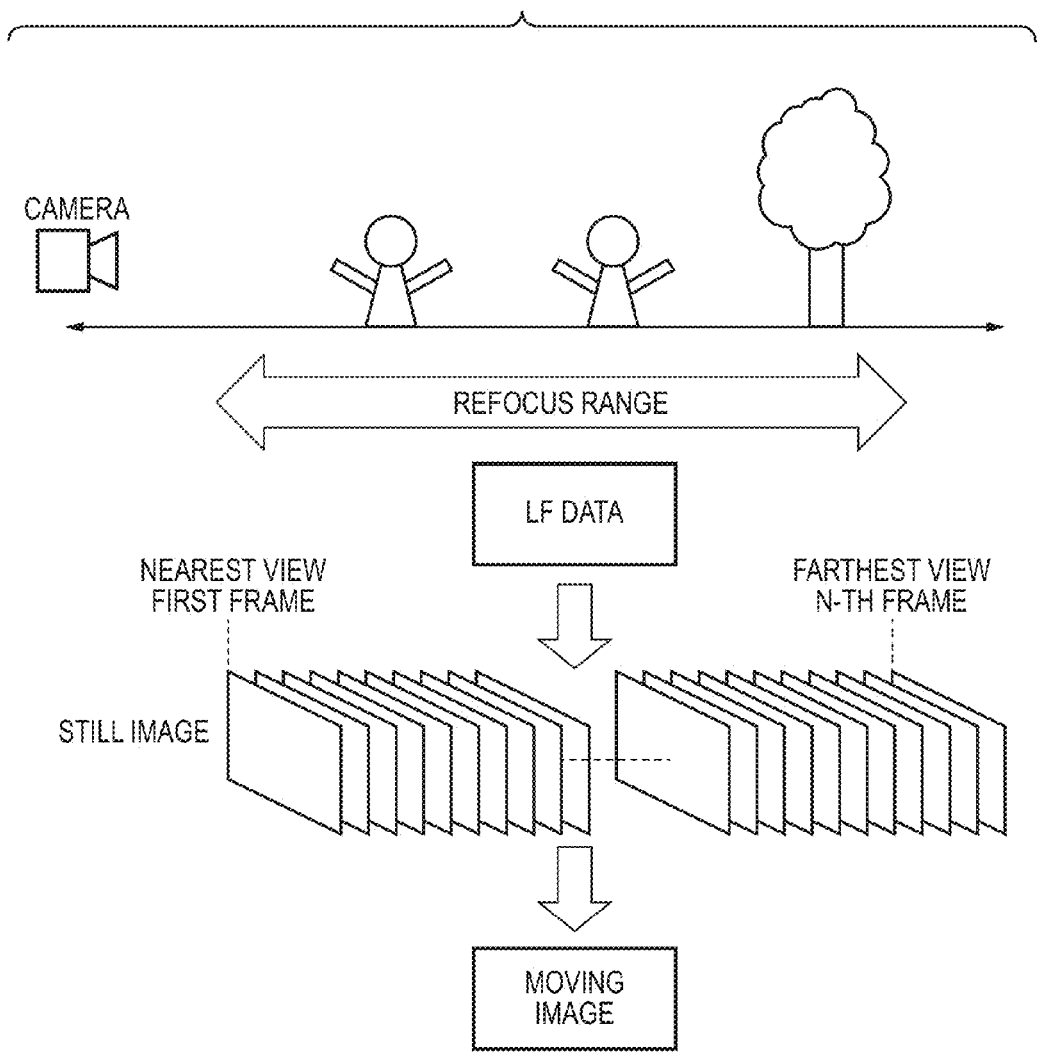
FIG. 8 is a view for explaining a moving image generated from LF data according to the embodiment of the present invention.

In step S507, the controller 101 controls the image processor 110 to generate a moving image corresponding to LF data by concatenating a plurality of refocus images generated for a plurality of different focal lengths. In this embodiment, the image processor 110 generates a N-frame moving image obtained by concatenating N refocus images, which are generated while sequentially setting focal lengths included in the refocus range, in ascending order of focal length to be focused, as shown in FIG. 8. That is, the moving image to be generated includes frames to be focused in turn on all objects included in a range of focal lengths settable for the obtained LF data.

Furthermore, the moving image to be generated is encoded by the image processor 110 according to a predetermined encoding method (for example, the standard such as MPEG, H.264, H.265, HEVC (High Efficiency Video Coding)), and is generated as general-purpose moving image data.

In step S508, the controller 101 records the LF data obtained in step S502 and the moving image generated in step S507 in the recording medium 112 in association with each other, thus ending this imaging processing. Note that the LF data and moving image may be recorded as, for example, independent files, and header information of each LF data may include storage destination information of the moving image. Also, the moving image may be recorded as, for example, a thumbnail image in header information of each LF data.

<List Display Processing>

Figure 9:
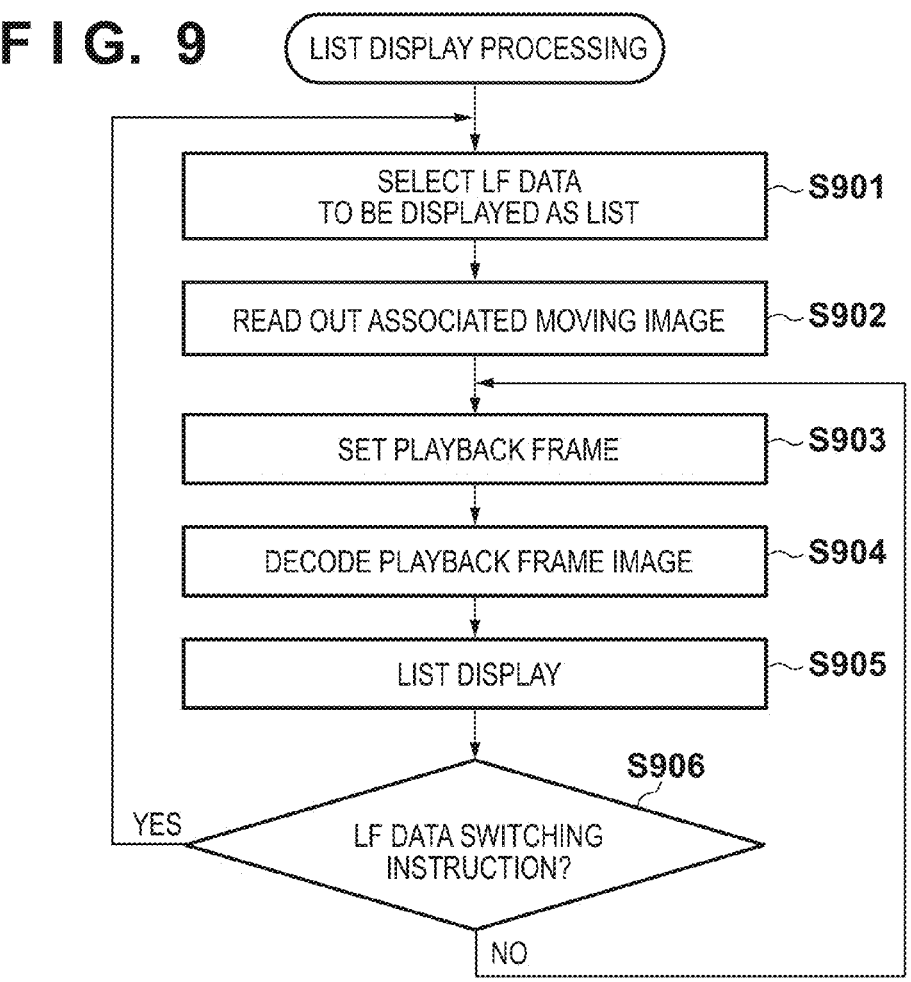
FIG. 9 is a flowchart showing an example of list display processing according to the embodiment of the present invention.

List display processing of the digital camera 100 of this embodiment, which is executed when LF data recorded in the recording medium 112 are displayed as a list will be described in detail below with reference to the flowchart shown in FIG. 9. The processing corresponding to this flowchart can be implemented when the controller 101 reads out a corresponding processing program stored in, for example, the ROM 102, extracts the readout program onto the RAM 103, and executes the extracted program. Note that the following description will be given under the assumption that this list display processing is started, for example, when the digital camera 100 is activated while being set in a playback mode.

Figure 10:
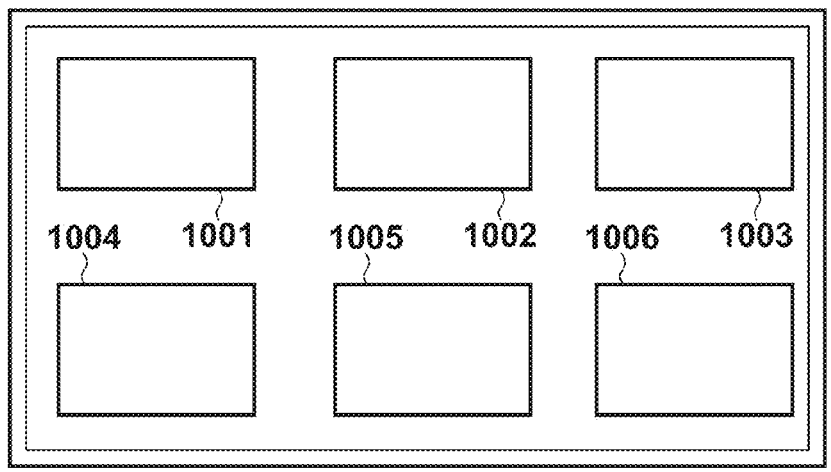
FIG. 10 is a view showing an example of a list display screen according to the embodiment of the present invention.

In step S901, the controller 101 sets LF data to be displayed as a list on the display unit 111 of those recorded in the recording medium 112. In this embodiment, assume that six data 1001, 1002, 1003, 1004, 1005, and 1006 of LF data recorded in the recording medium 112 are displayed on a list screen on the display unit 111, as shown in FIG. 10.

In step S902, the controller 101 reads out moving images which are recorded in association with the LF data to be displayed as a list from the recording medium 112 onto the RAM 103.

In step S903, the controller 101 sets a playback frame to be displayed on the list screen for each of moving images read out onto the RAM 103. More specifically, the controller 101 sets, as a playback frame, a first frame when a frame is set for the first time, and the next frame when a frame has already been set. Note that when the already set frame is a last frame of that moving image, the controller 101 may set, for example, a first frame of that moving image as the playback frame.

In step S904, the controller 101 applies decoding processing to the respective moving images read out onto the RAM 103 to obtain images of the playback frames set in step S903.

In step S905, the controller 101 controls the image processor 110 to apply reduction processing to the images of the playback frames of the respective moving images, and to display them as the list screen on the display unit 111.

The controller 101 judges in step S906 whether or not a switching instruction of LF data to be displayed as a list is input. More specifically, the controller 101 judges whether or not the switching instruction is input by judging whether or not a control signal indicating, for example, an operation of a button corresponding to a page feed instruction by the user is received from the operation input unit 113. If the controller 101 judges that the switching instruction of LF data to be displayed as a list is input, it returns the process to step S901; otherwise, it returns the process to step S903.

Assume that this list display processing ends when a mode of the digital camera 100 is changed from the playback mode or when a choice instruction of one LF data is input.

As described above, the image processing apparatus of this embodiment can display information which allows the user to specify objects included in a scene, LF data of which is recorded.

[Modification]

In the description of the aforementioned embodiment, a moving image in which a focal length to be focused is continuously switched within the settable focal length range is generated. However, the present invention is not limited to such specific embodiment. This modification will explain a method of generating a moving image which allows the user to easily recognize a specific object included in a scene, LF data of which is recorded, below.

<Arrangement of Digital Camera 100>

The arrangement of the digital camera 100 of this modification is the same as that of the aforementioned embodiment except that it further includes a face detector 114 to be described below, and a description of other blocks will not be repeated.

The face detector 114 applies face detection processing for detecting a human face as a specific object to a refocus image generated from LF data. The face detector 114 judges using pre-stored face patterns required to detect human faces whether or not a refocus image includes a human face. Note that the following description of this modification will be given under the assumption that a human face is detected. However, the specific object is not limited to this. For example, a human body or an object registered in advance may be detected.

<Imaging Processing>

Figure 11:
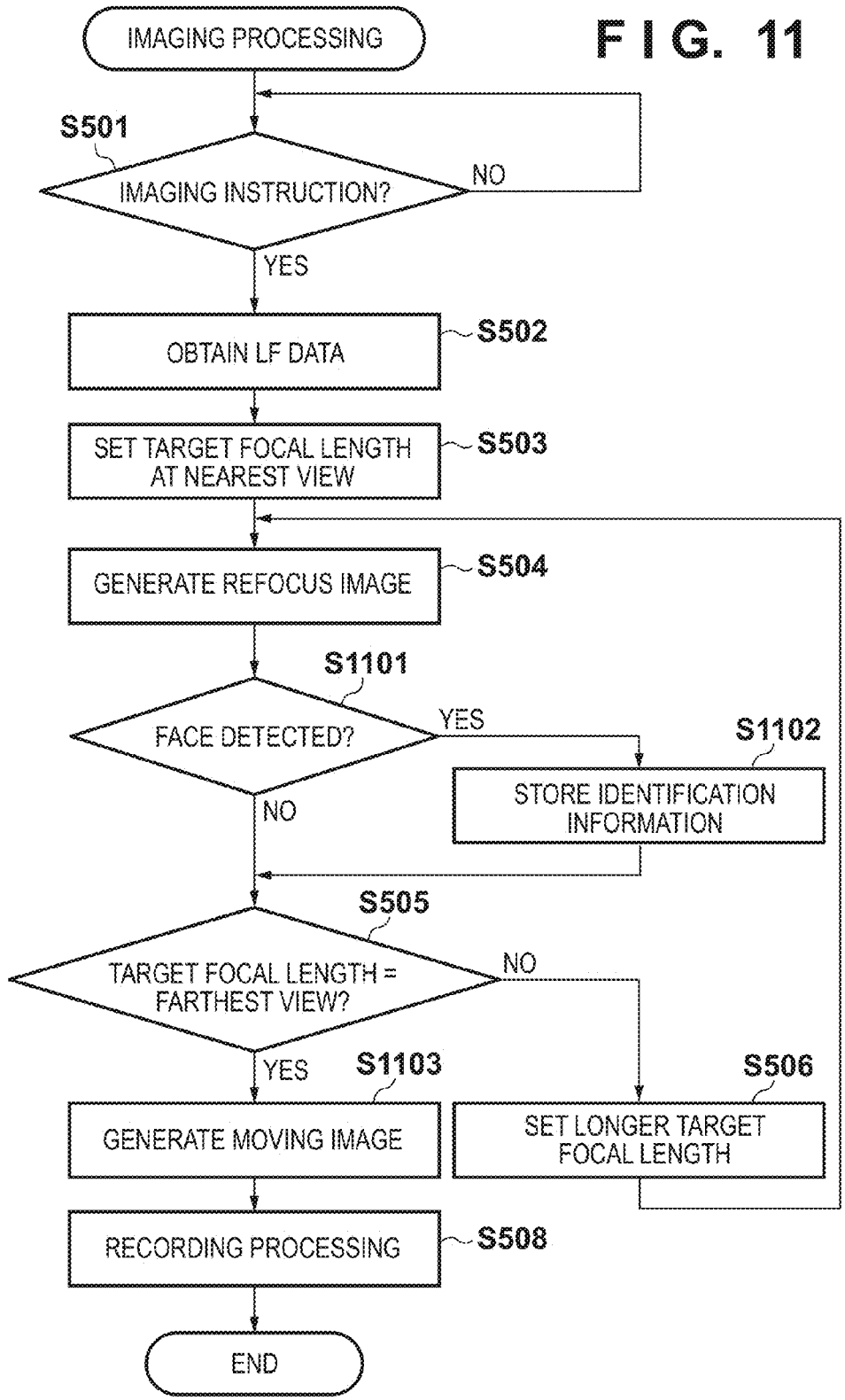
FIG. 11 is a flowchart showing an example of imaging processing according to a modification of the present invention.

Imaging processing of the digital camera 100 of this modification will be described in detail below with reference to the flowchart shown in FIG. 11. The processing corresponding to this flowchart can be implemented when the controller 101 reads out a corresponding processing program stored in, for example, the ROM 102, extracts the readout program onto the RAM 103, and executes the extracted program. Note that the following description will be given under the assumption that this imaging processing is started, for example, when the digital camera 100 is activated. Also, in the imaging processing of this modification, the same step numbers denote steps of the same processes as in the imaging processing of the aforementioned embodiment, and a description thereof will not be repeated. Only steps of characteristic processes in the imaging processing of this modification will be described below.

After a refocus image focused at the target focal length is generated in step S504, the controller 101 controls the face detector 114 to apply the face detection processing for detecting a human face to the generated refocus image, and judges in step S1101 whether or a human face is included. If the controller 101 judges that the refocus image includes a human face, it shifts the process to step S1102; otherwise, it shifts the process to step S505.

In step S1102, the controller 101 adds identification information (for example, information indicating the number of order of a focal point position from the nearest view) of the generated refocus image to a list of refocus images from which human a face is detected, which list is stored in the RAM 103. Note that the following description of this modification will be given under the assumption that a face detection result is held by adding the identification information to the list of refocus images from which a human face is detected. However, the method of storing information indicating whether or not a human face is detected is not limited to this. That is, as information indicating whether or not a human face is detected from a refocus image, for example, information indicating that a face is detected may be associated with a refocus image, as is easily anticipated.

After completion of generation of refocus images for the overall refocus range by choosing the target focal length in turn in this way, the controller 101 advances the process to step S1103.

Figure 12:
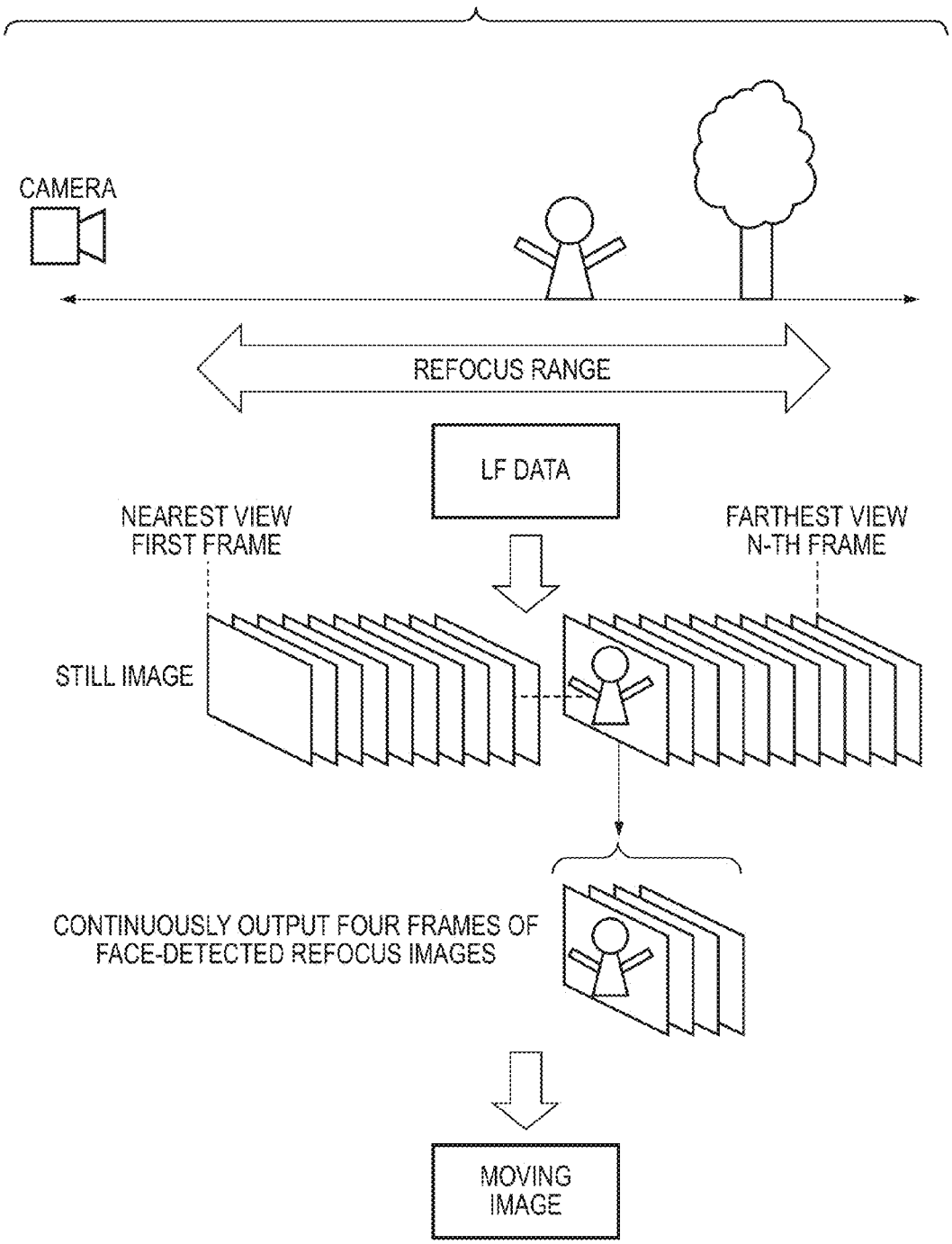
FIG. 12 is a view for explaining a moving image generated from LF data according to the modification of the present invention.

In step S1103, the controller 101 controls the image processor 110 to generate a moving image corresponding to LF data by concatenating a plurality of refocus images generated for a plurality of different focal lengths. At this time, the image processor 110 refers to the list of refocus images from which a human face is detected, which list is stored in the RAM 103, and generates a moving image to continuously include a plurality of refocus images from which faces are detected. That is, as shown in, for example, FIG. 12, the image processor 110 generates a moving image at a playback frame rate of 60 FPS to continuously include four frames of refocus images from which a face is detected. That is, the moving image generated this way allows to play back refocus images at focal point positions where a human face as a specific object is included at a playback frame rate of 15 FPS.

In this manner, the digital camera 100 of this modification can generate a moving image which allows the user to easily recognize a specific object included in a scene, output LF data of which is recorded.

Note that in the description of the aforementioned embodiment and modification, an in-focus object transits in ascending order of focal length in a moving image generated for LF data. However, the present invention is not limited to this. In a moving image, for example, an in-focus object may transit in descending order of focal length. Also, in a moving image, an in-focus object may transit according to the focal lengths only within a partial settable focal length range (for example, only a detection range of a person). In such case, the focal length range used to generate a moving image and the transition order of focal lengths may be set by the user.

Figure 13A:
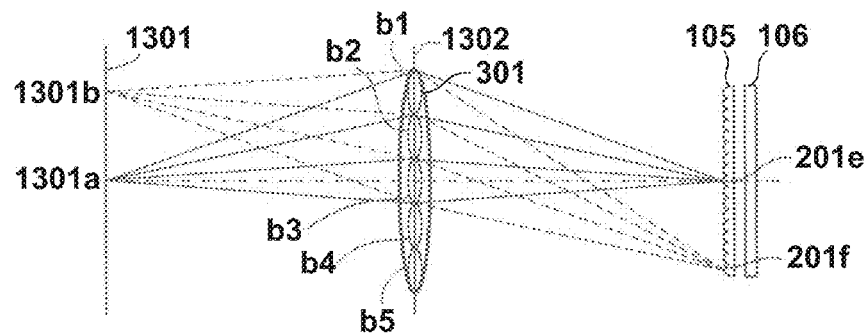
FIGS. 13A, 13B, and 13C are views showing an example of an optical system according to the modification of the present invention.
Figure 13B:
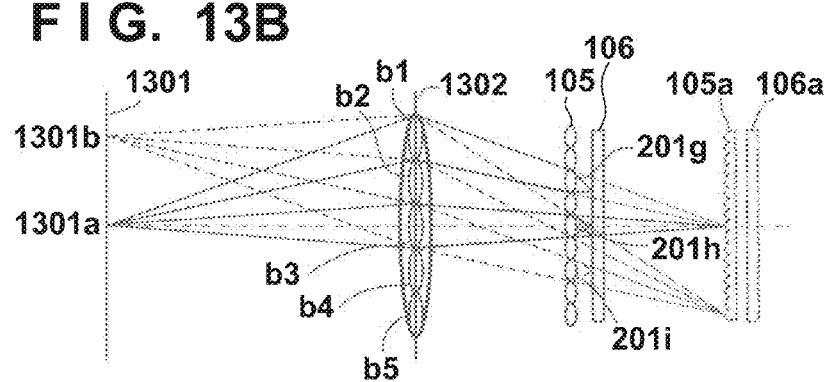
Figure 13C:
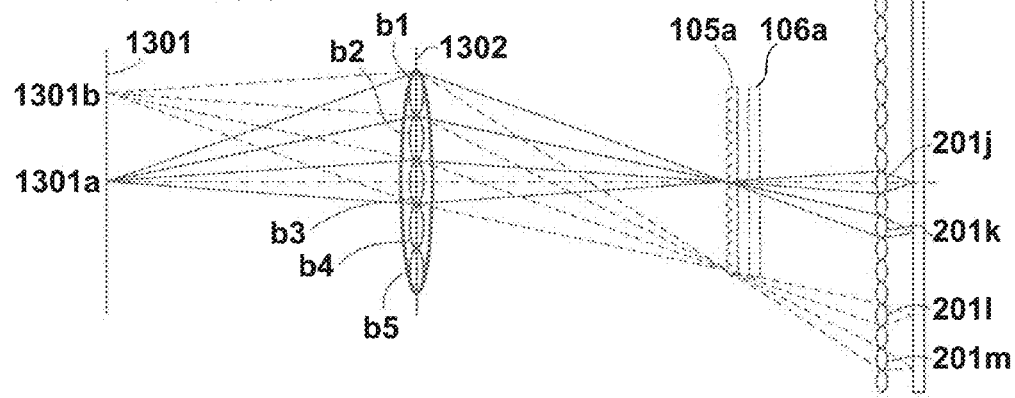

Another example of an optical system which is applicable to this embodiment will be described below with reference to FIGS. 13A, 13B, and 13C. FIGS. 13A, 13B, and 13C are views illustrating states in which light fluxes from an object are focused on the imaging element 106. In FIGS. 13A, 13B, and 13C, the same reference numerals denote the same parts as those in FIGS. 1 and 3.

FIGS. 13A, 13B, and 13C correspond to the optical system described using FIG. 3. However, in the imaging element 106, the number of pixels to be assigned to one microlens in the microlens array 105 is 25 (=5×5), and the exit pupil 301 is expressed by five pupil regions b1, b2, b3, b4, and b5 in the vertical direction. FIG. 13A shows an example in which the microlens array 105 is laid out in the vicinity of an imaging plane of the imaging optical system 104. FIG. 13B shows an example in which the microlens array 105 is laid out to be closer to the object side than the imaging plane of the imaging optical system 104. FIG. 13C shows an example in which the microlens array 105 is laid out on the side farther from the object than the imaging plane of the imaging optical system 104.

Referring to FIGS. 13A, 13B, and 13C, reference numeral 106 denotes an imaging element; 105, a microlens array; b1, b2, b3, b4, and b5, pupil regions; 1301, an object plane; 1301a and 1301b, appropriate points on an object; and 1302, a pupil plane of the imaging optical system. Also, reference numerals 201e, 201f, 201g, 201h, 201i, 201j, 201k, 201l, and 201m respectively denote specific microlenses on the microlens array 105. In FIGS. 13B and 13C, reference numeral 106a denotes an imaginary imaging element; and 105a, an imaginary microlens array. The imaginary imaging element 106a and imaginary microlens array 105a are shown as a reference required to clarify the correspondence relationship with FIG. 13A. Light fluxes which emanate from the point 1301a and pass through the regions b1 and b3 on the pupil plane are illustrated as solid lines, and those which emanate from the point 1301b and pass through the regions b1 and b3 on the pupil plane are illustrated as broken lines.

In the example of FIG. 13A, since the microlens array 105 is laid out in the vicinity of the imaging plane of the imaging optical system 104, the imaging element 106 and the pupil plane 1302 of the imaging optical system have a conjugate relation. Furthermore, the object plane 1301 and the microlens array 105 have a conjugate relation. For this reason, light fluxes emanating from the point 1301a on the object reach the microlens 201e, and those emanating from the point 1301b reach the microlens 201f, and light fluxes which have respectively passed through the regions b1 to b5 respectively reach corresponding pixels arranged under the microlenses.

In the example of FIG. 13B, light fluxes coming from the imaging optical system 104 are imaged by the microlens array 105, and the imaging element 106 is arranged on that imaging plane. With this layout, the object plane 1301 and imaging element 106 have a conjugate relation. Light fluxes which emanate from the point 1301a on the object and pass through the region b1 on the pupil plane reach the microlens 201g, and those which emanate from the point 1301a on the object and pass through the region b3 on the pupil plane reach the microlens 201h. Light fluxes which emanate from the point 1301b on the object and pass through the region b1 on the pupil plane reach the microlens 201*h*, and those which emanate from the point 1301*b* on the object and pass through the region b3 on the pupil plane reach the microlens 201*i*. Light fluxes which have passed through the microlenses reach the corresponding pixels arranged under the microlenses. In this way, light fluxes are imaged at different positions depending on points on the object and passing regions on the pupil plane. When these pieces of information are re-arranged at positions on the imaginary imaging element 106*a*, the same information (reconstructed image) as in FIG. 13A can be obtained. That is, pieces of information of passed pupil regions (angles of incidence) and positions on the imaging element can be obtained.

In the example of FIG. 13C, light fluxes coming from the imaging optical system 104 are re-imaged by the microlens array 105 (since diverging light fluxes which have been imaged once are imaged again, such process is called "re-imaging"), and the imaging element 106 is arranged on that imaging plane. With this layout, the object plane 1301 and imaging element 106 have a conjugate relation. Light fluxes which emanate from the point 1301*a* on the object and pass through the region b1 on the pupil plane reach the microlens 201*k*, and those which emanate from the point 1301*a* on the object and pass through the region b3 on the pupil plane reach the microlens 201*j*. Light fluxes which emanate from the point 1301*b* on the object and pass through the region b1 on the pupil plane reach the microlens 201*m*, and those which emanate from the point 1301*b* on the object and pass through the region b3 on the pupil plane reach the microlens 201*l*. Light fluxes which have passed through the microlenses reach the corresponding pixels arranged under the microlenses. As in FIG. 13B, when these pieces of information are re-arranged at positions on the imaginary imaging plane element 106*a*, the same information (reconstructed image) as in FIG. 13A can be obtained. That is, pieces of information of passed pupil regions (angles of incidence) and positions on the imaging element can be obtained.

Note that FIGS. 13A to 13C show the examples in which the position information and angle information can be obtained using the microlens array (phase modulation element) as a pupil dividing unit. However, other optical arrangements can be used as long as position information and angle information (equivalent to limitations of the passing regions of the pupil) can be obtained. For example, a method of inserting a mask (gain modulation element) having an appropriate pattern into the optical path of the imaging optical system can be used.

Also, as a method of obtaining an image at an arbitrary focal length from LF data, for example, a method disclosed in Japanese Patent Laid-Open No. 2011-22796 is applicable. More specifically, images captured from at least two different viewpoints are obtained by a multi-eye camera prepared by laying out a plurality of cameras in a grid pattern on a two-dimensional plane, and these plurality of images are processed to obtain an image at an arbitrary focal length.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-034537, filed Feb. 20, 2012, and 2012-288561, filed Dec. 28, 2012, which are hereby incorporated by reference herein in their entirety.

What is claimed is:

1. An image processing apparatus comprising:
an obtaining unit configured to obtain an image signal, which is captured by an image capturing apparatus, and in which a respective pixel corresponds to a light flux of a different combination of a pupil region, through which the light flux has passed, in an imaging optical system of the image capturing apparatus, and an incident direction;
a setting unit configured to set a focal plane in association with a reconstructed image generated from the image signal obtained by said obtaining unit;
a generation unit configured to generate the reconstructed image focused at the focal plane set by said setting unit by adding pixel values of the image signal, wherein the pixel values correspond to respective pixels of the image to be reconstructed at the focal plane; and
an output unit configured to generate and output a moving image by including, as frames, a plurality of reconstructed images generated by said generation unit in association with a plurality of different focal planes.

2. The apparatus according to claim 1, wherein said output unit generates the moving image including the plurality of reconstructed images generated in association with the plurality of different focal planes in an order of lengths from the capturing apparatus to an object, which corresponds to the focal plane.

3. The apparatus according to claim 2, further comprising a selection unit configured to select whether to set an order of concatenating the plurality of reconstructed images generated in association with the plurality of different focal planes to be ascending order of the lengths or descending order of the lengths.

4. The apparatus according to claim 1, further comprising a detection unit configured to detect a specific object from the reconstructed image generated by said generation unit, wherein said output unit generates the moving image to continuously include images for a plurality of frames, from which the specific object is detected by said detection unit, out of the plurality of reconstructed images generated in association with the plurality of different focal planes.

5. The apparatus according to claim 1, wherein said output unit outputs the moving image in association with the image signals.

6. The apparatus according to claim 1, wherein said output unit outputs the moving image by encoding the moving image using a predetermined encoding method.

7. The apparatus according to claim 1, wherein said output unit outputs the moving image by encoding the moving image according to a standard.

8. The apparatus according to claim 7, wherein the standard is an MPEG standard.

9. The apparatus according to claim 7, wherein the standard is an HEVC standard.

10. The apparatus according to claim 7, wherein the standard is an H.265 standard.

11. The apparatus according to claim 1, further comprising a recoding unit configured recode, to a recording medium, the moving image as a file format.

12. The apparatus according to claim 1, further comprising a display unit configured to perform, using a display medium, playing back of the moving image as a display corresponding to the image signal.

13. The apparatus according to claim 1, wherein said setting units sets the focal plane by a user operation.

14. The apparatus according to claim 1, wherein said output unit generates the moving image in which a reconstructed image of each frame is associated with a focal plane within a partial settable range of said setting unit.

15. The apparatus according to claim 1, wherein each frame of the moving image is associated with a focal plane within a partial settable range of said setting unit.

16. The apparatus according to claim 1, wherein said output unit generates the moving image by including reconstructed images in associated with an equivalent focal plane as continuous frames.

17. The apparatus according to claim 1, wherein the moving image has continuous frames in which reconstructed images of the frames are associated with an equivalent focal plane.

18. The apparatus according to claim 1, further comprising a display unit configured to perform, using a display medium, playing back of the moving image generated from an image signal captured by the image capturing apparatus with a display corresponding to another image signal captured by the image capturing unit.

19. The apparatus according to claim 1, wherein the image signal is a signal single-captured by the image capturing unit.

20. The apparatus according to claim 1, wherein the image signal is corresponding to a light field data.

21. An image capturing apparatus comprising:
an imaging unit configured to output, by imaging, an image signal in which a respective pixel corresponds to a light flux of a different combination of a pupil region, through which the light flux has passed, in an imaging optical system, and an incident direction;
a setting unit configured to set a focal plane in association with a reconstructed image generated from the image signal output from said imaging unit;
a generation unit configured to generate the reconstructed image focused at the focal plane set by said setting unit by adding pixel values of the image signal, wherein the pixel values correspond to respective pixels of the image to be reconstructed at the focal plane; and
a recording unit configured to generate a moving image including, as frames, a plurality of reconstructed images generated by said generation unit in association with a plurality of different focal planes and record the moving image in association with the image signal.

22. A control method of an image processing apparatus, comprising:
an obtaining step of controlling an obtaining unit of the image processing apparatus to obtain an image signal, which is captured by an image capturing apparatus, and in which a respective pixel corresponds to a light flux of a different combination of a pupil region, through which the light flux has passed, in an imaging optical system of the image capturing apparatus, and an incident direction;
a setting step of controlling a setting unit of the image processing apparatus to set a focal plane in association with a reconstructed image generated from the image signal obtained in the obtaining step;
a generation step of controlling a generation unit of the image processing apparatus to generate the reconstructed image focused at the focal plane set in the setting step by adding pixel values of the image signal, wherein the pixel values correspond to respective pixels of the image to be reconstructed at the focal plane; and
an output step of controlling an output unit of the image processing apparatus to generate and output a moving image including, as frames, a plurality of reconstructed images generated in the generation step in association with a plurality of different focal planes.

23. A non-transitory recording medium recording a program for controlling a computer to execute respective steps of a control method of an image processing apparatus, the control method comprising:
an obtaining step of controlling an obtaining unit of the image processing apparatus to obtain an image signal, which is captured by an image capturing apparatus, and in which a respective pixel corresponds to a light flux of a different combination of a pupil region, through which the light flux has passed, in an imaging optical system of the image capturing apparatus, and an incident direction;
a setting step of controlling a setting unit of the image processing apparatus to set a focal plane in association with a reconstructed image generated from the image signal obtained in the obtaining step;
a generation step of controlling a generation unit of the image processing apparatus to generate the reconstructed image focused at the focal plane set in the setting step by adding pixel values of the image signal, wherein the pixel values correspond to respective pixels of the image to be reconstructed at the focal plane; and
an output step of controlling an output unit of the image processing apparatus to generate and output a moving image including, as frames, a plurality of reconstructed images generated in the generation step in association with a plurality of different focal planes.

24. A control method of an image capturing apparatus, comprising:
an imaging step of controlling an imaging unit of the image capturing apparatus to output, by imaging, an image signal in which a respective pixel corresponds to a light flux of a different combination of a pupil region, through which the light flux has passed, in an imaging optical system, and an incident direction;
a setting step of controlling a setting unit of the image capturing apparatus to set a focal plane in association with a reconstructed image generated from the image signal output in the imaging step;
a generation step of controlling a generation unit of the image capturing apparatus to generate the reconstructed image focused at the focal plane set in the setting step by adding pixel values of the image signal, wherein the pixel values corresponds to respective pixels of the image to be reconstructed at the focal plane; and
a recording step of controlling a recording unit of the image capturing apparatus to generate a moving image including, as frames, a plurality of reconstructed images generated in the generation step in association with a plurality of different focal planes and record the moving image in association with the image signal.

25. A non-transitory recording medium recording a program for controlling a computer to execute respective steps of a control method of an image capturing apparatus, the control method comprising:

an imaging step of controlling an imaging unit of the image capturing apparatus to output, by imaging, an image signal in which a respective pixel corresponds to a light flux of a different combination of a pupil region, through which the light flux has passed, in an imaging optical system, and an incident direction;

a setting step of controlling a setting unit of the image capturing apparatus to set a focal plane in association with a reconstructed image generated from the image signal output in the imaging step;

a generation step of controlling a generation unit of the image capturing apparatus to generate the reconstructed image focused at the focal plane set in the setting step by adding pixel values of the image signal, wherein the pixel values corresponds to respective pixels of the image to be reconstructed at the focal plane; and a recording step of controlling a recording unit of the image capturing apparatus to generate a moving image including, as frames, a plurality of reconstructed images generated in the generation step in association with a plurality of different focal planes and record the moving image in association with the image signal.

26. An image processing apparatus comprising:

an obtaining unit configured to obtain a digital signal, which is captured by an image capturing apparatus, and in which a respective pixel corresponds to a light flux of a different combination of a pupil region, through which the light flux has passed, in an image optical system of the image capturing apparatus, and an incident direction;

a setting unit configured to set a focal plane in association with an image generated from the digital signal obtained by said obtaining unit;

a generation unit configured to generate the image focused at the focal plane set by said setting unit by adding pixel values of the digital signal, wherein the pixel values correspond to respective pixels of the image at the focal plane; and an output unit configured to generate and output a moving image including, as frames, a plurality of images generated by said generation unit in association with a plurality of different focal planes.

27. An image capturing apparatus comprising:

an imaging unit configured to output, by imaging, a digital signal in which a respective pixel corresponds to a light flux of a different combination of a pupil region, through which the light flux has passed, in an imaging optical system, and an incident direction;

a setting unit configured to set a focal plane in association with an image generated from the digital signal output from said imaging unit;

a generation unit configured to generate the image focused at the focal plane set by said setting unit by adding pixel values of the digital signal, wherein the pixel values correspond to respective pixels of the image at the focal plane; and a recording unit configured to generate a moving image including, as frames, a plurality of images generated by said generation unit in association with a plurality of different focal planes and record the moving image in association with the digital signal.

28. A control method of an image processing apparatus, comprising:

an obtaining step of controlling an obtaining unit of the image processing apparatus to obtain a digital signal, which is captured by an image capturing apparatus, and in which a respective pixel corresponds to a light flux of a different combination of a pupil region, through which the light flux has passed, in an imaging optical system of the image capturing apparatus, and an incident direction;

a setting step of controlling a setting unit of the image processing apparatus to set a focal plane in association with an image generated from the digital signal obtained in the obtaining step;

a generation step of controlling a generation unit of the image processing apparatus to generate the image focused at the focal plane set in the setting step by adding pixel values of the digital signal, wherein the pixel values correspond to respective pixels of the image at the focal plane; and an output step of controlling an output unit of the image processing apparatus to generate and output a moving image including, as frames, a plurality of images generated in the generation step in association with a plurality of different focal planes.

29. A control method of an image capturing apparatus, comprising:

an imaging step of controlling an imaging unit of the image capturing apparatus to output, by imaging, a digital signal in which a respective pixel corresponds to a light flux of a different combination of a pupil region, through which the light flux has passed, in an imaging optical system, and an incident direction;

a setting step of controlling a setting unit of the image capturing apparatus to set a focal plane in association with an image generated from the digital signal output in the imaging step;

a generation step of controlling a generation unit of the image capturing apparatus to generate the image focused at the focal plane set in the setting step by adding pixel values of the digital signal, wherein the pixel values corresponds to respective pixels of the image at the focal plane; and a recording step of controlling a recording unit of the image capturing apparatus to generate a moving image including, as frames, a plurality of images generated in the generation step in association with a plurality of different focal planes and record the moving image in association with the digital signal.

* * * * *